United States Patent
Bem et al.

(10) Patent No.: US 8,195,674 B1
(45) Date of Patent: *Jun. 5, 2012

(54) LARGE SCALE MACHINE LEARNING SYSTEMS AND METHODS

(75) Inventors: Jeremy Bem, Berkeley, CA (US); Georges R. Harik, Mountain View, CA (US); Joshua L. Levenberg, Redwood City, CA (US); Noam Shazeer, Stanford, CA (US); Simon Tong, Mountain View, CA (US)

(73) Assignee: Google Inc., Mountain View, CA (US)

( * ) Notice: Subject to any disclaimer, the term of this patent is extended or adjusted under 35 U.S.C. 154(b) by 115 days.

This patent is subject to a terminal disclaimer.

(21) Appl. No.: 12/822,902

(22) Filed: Jun. 24, 2010

Related U.S. Application Data (63) Continuation of application No. 11/736,193, filed on Apr. 17, 2007, which is a continuation of application No. 10/734,584, filed on Dec. 15, 2003, now Pat. No. 7,222,127, which is a continuation-in-part of application No. 10/706,991, filed on Nov. 14, 2003, now Pat. No. 7,231,399.

(51) Int. Cl.
*G06F 15/18* (2006.01)
*G06F 17/30* (2006.01)

(52) U.S. Cl. .............. 707/749; 706/12; 706/20

(58) Field of Classification Search .......... 706/12, 706/20; 707/999.002, 999.102, 749, 603
See application file for complete search history.

(56) References Cited

U.S. PATENT DOCUMENTS

| | | | |
|---|---|---|---|
| 5,897,627 A | 4/1999 | Leivian et al. | |
| 5,950,186 A | 9/1999 | Chaudhuri et al. | |
| 6,006,222 A | 12/1999 | Culliss | |
| 6,014,665 A | 1/2000 | Culliss | |
| 6,078,916 A | 6/2000 | Culliss | |
| 6,088,692 A | 7/2000 | Driscoll | |
| 6,144,944 A | 11/2000 | Kurtzman et al. | |
| 6,182,068 B1 | 1/2001 | Culliss | |
| 6,285,999 B1 | 9/2001 | Page | |
| 6,311,175 B1 | 10/2001 | Adriaans et al. | |
| 6,397,211 B1 | 5/2002 | Copper | |
| 6,463,430 B1 | 10/2002 | Brady et al. | |
| 6,523,020 B1 | 2/2003 | Weiss | |
| 6,539,377 B1 | 3/2003 | Culliss | |
| 6,546,388 B1 | 4/2003 | Edlund et al. | |
| 6,546,389 B1 | 4/2003 | Agrawal et al. | |
| 6,651,054 B1 | 11/2003 | De Judicibus | |
| 6,714,929 B1 | 3/2004 | Micaelian et al. | |
| 6,738,764 B2 | 5/2004 | Mao et al. | |
| 6,751,611 B2 | 6/2004 | Krupin et al. | |
| 6,782,390 B2 | 8/2004 | Lee et al. | |
| 6,799,176 B1 | 9/2004 | Page | |
| 6,804,659 B1 | 10/2004 | Graham et al. | |
| 6,836,773 B2 | 12/2004 | Tamayo et al. | |

(Continued)

OTHER PUBLICATIONS

Copending U.S. Appl. No. 11/736,193, filed Apr. 17, 2007 entitled "Large Scale Machine Learning Systems and Methods" by Jeremy Bem et al., 35 pages.

(Continued)

*Primary Examiner* — James Trujillo
*Assistant Examiner* — Jorge A Casanova
(74) *Attorney, Agent, or Firm* — Harrity & Harrity, LLP (57) ABSTRACT

A system for generating a model is provided. The system generates, or selects, candidate conditions and generates, or otherwise obtains, statistics regarding the candidate conditions. The system also forms rules based, at least in part, on the statistics and the candidate conditions and selectively adds the rules to the model.

18 Claims, 5 Drawing Sheets

U.S. PATENT DOCUMENTS

| | | | |
|---|---|---|---|
| 6,947,930 | B2 | 9/2005 | Anick et al. |
| 7,007,074 | B2 | 2/2006 | Radwin |
| 7,058,628 | B1 | 6/2006 | Page |
| 7,065,524 | B1 | 6/2006 | Lee |
| 7,080,063 | B2 | 7/2006 | Campos et al. |
| 7,089,194 | B1 | 8/2006 | Berstis et al. |
| 7,100,111 | B2 | 8/2006 | McElfresh et al. |
| 7,222,127 | B1 | 5/2007 | Bem et al. |
| 7,231,399 | B1 | 6/2007 | Bem et al. |
| 7,743,050 | B1 | 6/2010 | Bem et al. |
| 2002/0083067 | A1 | 6/2002 | Tamayo et al. |
| 2002/0161763 | A1 | 10/2002 | Ye et al. |
| 2002/0184181 | A1 | 12/2002 | Agarwal et al. |
| 2003/0195877 | A1 | 10/2003 | Ford et al. |
| 2003/0197837 | A1 | 10/2003 | Gyu Lee |
| 2004/0088308 | A1 | 5/2004 | Bailey et al. |
| 2005/0060281 | A1 | 3/2005 | Bucher et al. |
| 2005/0071741 | A1 | 3/2005 | Acharya et al. |
| 2005/0100209 | A1 | 5/2005 | Lewis et al. |

OTHER PUBLICATIONS

U.S. Appl. No. 60/491,449, filed Jul. 31, 2003 entitled "Rule-Based Content Management System" by Tim Bucher et al., 69 pages.

http://www.httprevealer.com, "Creative Use of HttpRevealer—How does Google Toolbar Work?," Apr. 19, 2004 (print date); pp. 1-6.

Co-pending U.S. Appl. No. 11/712,263, filed Nov. 14, 2003 entitled "Targeting Advertisements Based on Predicted Relevance of the Advertisements" Jeremy Bem et al., 40 pages.

Justin Boyan et al., "A Machine Learning Architecture for Optimizing Web Search Engines,";Carnegie Mellon University, May 10, 1996, pp. 1-8.

"Click Popularity-DirectHit Technology Overview," http://www.searchengines.com/directhit.html, Nov. 10, 2003 (print date), 2 pages.

J.H. Friedman et al., "Additive Logistic Regression: a Statistical View of Boosting," Dept. Of Statistics, Stanford University Technical Report, Aug. 20, 1998.

A.Y. Ng et al., "On Discriminative vs. Generative classifiers: A comparison of logistic regression and naïve Bayes," in T. Dietterich, S. Becker and Z. Ghahramani (eds.), Advances in Neural Information Processing Systems 14, Cambridge, MA: MIT Press, 2002.

F. Crestani et al., "Is This Document Relevant? . . . Probably": A Survey of Probabilistic Models in Information Retrieval, ACM Computing Surveys, vol. 30, No. 4, Dec. 1998.

Weis et al., Rule-based Machine Learning Methods for Functional Prediction, Journal of AI Research, vol. 3, Dec. 1995, pp. 383-403.

J. Friedman et al., Additive Logistic Regression: A Statistical View of Boosting; Technical Report, Stanford University Statistics Department, Jul. 1998, pp. 1-45.

FIG. 2

LARGE SCALE MACHINE LEARNING SYSTEMS AND METHODS

RELATED APPLICATIONS

This application is a continuation of U.S. patent application Ser. No. 11/736,193, filed Apr. 17, 2007, which is a continuation of U.S. patent application Ser. No. 10/734,584, filed Dec. 15, 2003 (now U.S. Pat. No. 7,222,127), which is a continuation-in-part of U.S. patent application Ser. No. 10/706,991, filed Nov. 14, 2003 (now U.S. Pat. No. 7,231,399), the disclosures of which are incorporated herein by reference.

BACKGROUND OF THE INVENTION

1. Field of the Invention

The present invention relates generally to classification systems and, more particularly, to systems and methods for applying machine learning to various large data sets to generate a classification model.

2. Description of Related Art

Classification models have been used to classify a variety of elements. The classification models are built from a set of training data that usually includes examples or records, each having multiple attributes or features. The objective of classification is to analyze the training data and develop an accurate model using the features present in the training data. The model is then used to classify future data for which the classification is unknown. Several classification systems have been proposed over the years, including systems based on neural networks, statistical models, decision trees, and genetic models.

One problem associated with existing classification systems has to do with the volume of training data that they are capable of handling. Existing classification systems can only efficiently handle small quantities of training data. They struggle to deal with large quantities of data, such as more than one hundred thousand features.

Accordingly, there is a need for systems and methods that are capable of generating a classification model from a large data set.

SUMMARY OF THE INVENTION

Systems and methods, consistent with the principles of the invention, apply machine learning to large data sets to generate a classification model.

In accordance with one aspect consistent with the principles of the invention, a system for generating a model is provided. The system may include multiple nodes. At least one of the nodes is configured to select a candidate condition, request statistics associated with the candidate condition from other ones of the nodes, receive the requested statistics from the other nodes, form a rule based, at least in part, on the candidate condition and the requested statistics, and selectively add the rule to the model.

According to another aspect, a system for generating a model is provided. The system may form candidate conditions and generate statistics associated with the candidate conditions. The system may also form rules based, at least in part, on the candidate conditions and the generated statistics and selectively add the rules to the model.

According to yet another aspect, a method for generating a model in a system that includes multiple nodes is provided. The method may include generating candidate conditions, distributing the candidate conditions to the nodes, and generating statistics regarding the candidate conditions. The method may also include collecting the statistics for each of the candidate conditions at one of the nodes, generating rules based, at least in part, on the statistics and the candidate conditions, and selectively adding the rules to the model.

According to a further aspect, a system for generating a model is provided. The system may generate new conditions and distribute the new conditions to a set of nodes. Each of the nodes may generate statistics regarding the new conditions. The system may generate new rules based, at least in part, on the statistics and the new conditions and add at least one of the new rules to the model.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention.

Systems and methods consistent with the principles of the invention may apply machine learning to large data sets, such as data sets including over one hundred thousand features and/or one million instances. The systems and methods may be capable of processing a large data set in a reasonable amount of time to generate a classification model.

Different models may be generated for use in different contexts. For example, in an exemplary e-mail context, a model may be generated to classify e-mail as either spam or normal (non-spam) e-mail. In an exemplary advertisement context, a model may be generated to estimate the probability that a user will click on a particular advertisement. In an exemplary document ranking context, a model may be generated in connection with a search to estimate the probability that a user will find a particular search result relevant. Other models may be generated in other contexts where a large number of data items exist as training data to train the model.

Exemplary Model Generation System

Figure 1:
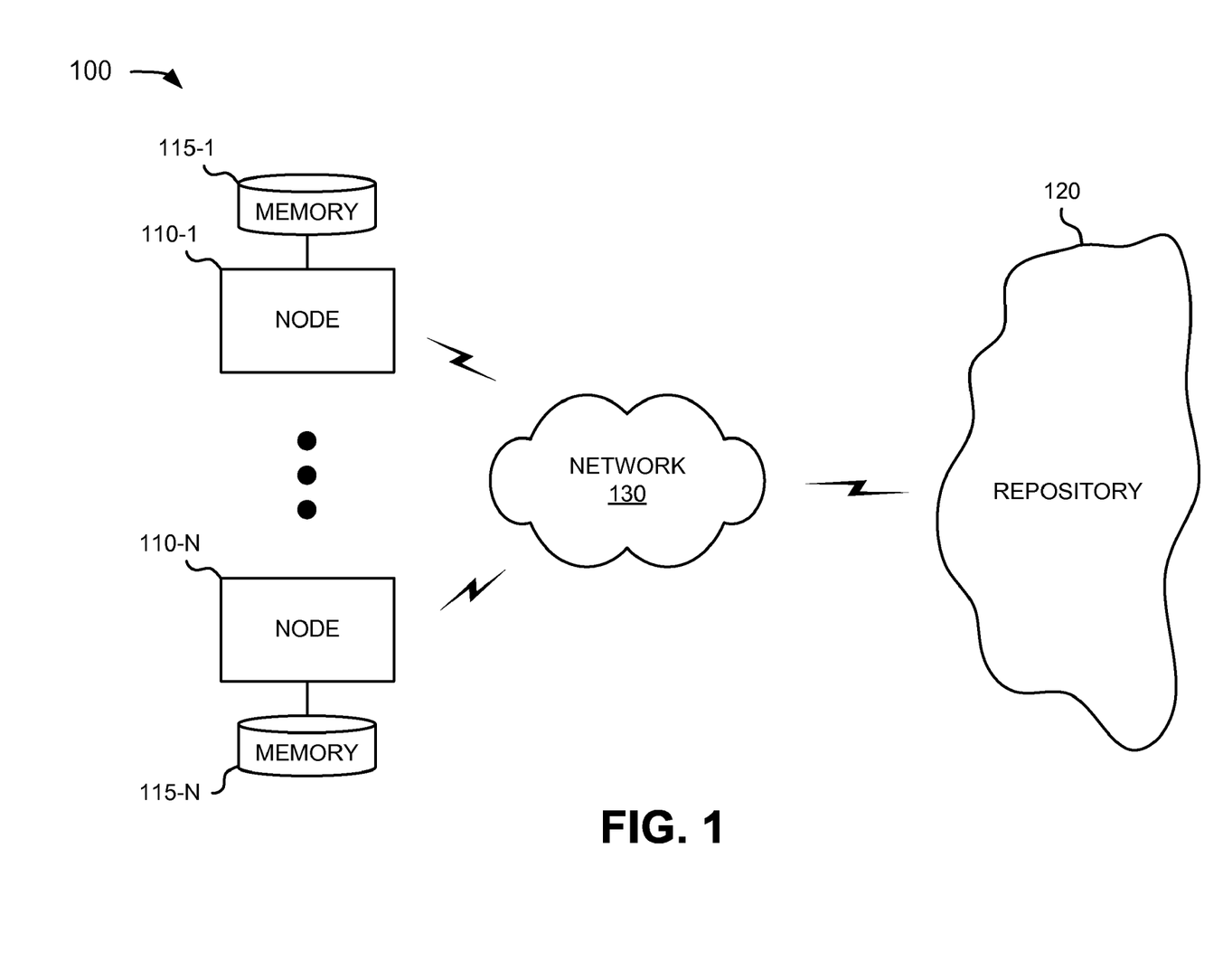
FIG. 1 is a diagram of an exemplary model generation system according to an implementation consistent with the principles of the invention.

FIG. 1 is an exemplary diagram of a model generation system 100 consistent with the principles of the invention. System 100 may include nodes 110-1 through 110-N (collectively referred to as nodes 110) optionally connected to a repository 120 via a network 130. Network 130 may include a local area network (LAN), a wide area network (WAN), a telephone network, such as the Public Switched Telephone Network (PSTN), an intranet, the Internet, a memory device, another type of network, or a combination of networks.

Repository 120 may include one or more logical or physical memory devices that may store a large data set (e.g., potentially over one million instances and/or one hundred thousand features) that may be used, as described in more detail below, to create and train a model. In the description to follow, the data set will be described in the exemplary e-mail context and, thus, data items relating to e-mail may be described. One of ordinary skill in the art would understand how to extend the description to other contexts.

In the exemplary e-mail context, the data set in repository 120 will be called "D." D may include multiple elements "d," called instances. Each instance d may include a set of features "X" and a label "Y." In one implementation, the label Y may be a boolean value (e.g., "spam" or "non-spam"), which may be called $y_0$ and $y_1$. In another implementation, the label Y may be a discrete value (e.g., values corresponding to categories of labels).

A feature X may be an aspect of the domain (e.g., the e-mail domain) that may be useful to determine the label (e.g., "the number of exclamation points in the message" or "whether the word 'free' appears in the message"). In one implementation, each feature X may include a boolean value (e.g., a value of zero or one based on whether the word "free" appears in the message). In another implementation, each feature X may include a discrete value (e.g., a value based, at least in part, on the number of exclamation points in the message). In yet another implementation, each feature X may include a real value (e.g., the time of day a message was sent). An instance d may be written as: $d=(x_1, x_2, x_3, \ldots, x_m, y)$, where $x_i$ is the value of the i-th feature $X_i$ and y is the value of the label.

Repository 120 could potentially store millions of distinct features. For efficiency, an instance d may be encoded using a sparse representation: if $x_i$ is zero, then its value is not stored for d. For example, assume that $X_2$ is the feature "does the word 'free' appear in the message." For a particular instance d, if the word "free" does not appear in the message, then $x_2$ is not stored for d.

Nodes 110 may include entities. An entity may be defined as a device, such as a personal computer, a wireless telephone, a personal digital assistant (PDA), a lap top, or another type of computation or communication device, a thread or process running on one of these devices, and/or an object executable by one of these device.

Each of nodes 110 may be responsible for a subset of instances. In one implementation, nodes 110 obtain their subset of instances from repository 120 when needed. In another implementation, each of nodes 110 may optionally store a copy of its subset of instances in a local memory 115. In this case, nodes 110 may retrieve their copy from repository 120. In yet another implementation, each of nodes 110 may store its subset of instances in local memory 115 and system 100 may include no repository 120.

Figure 2:
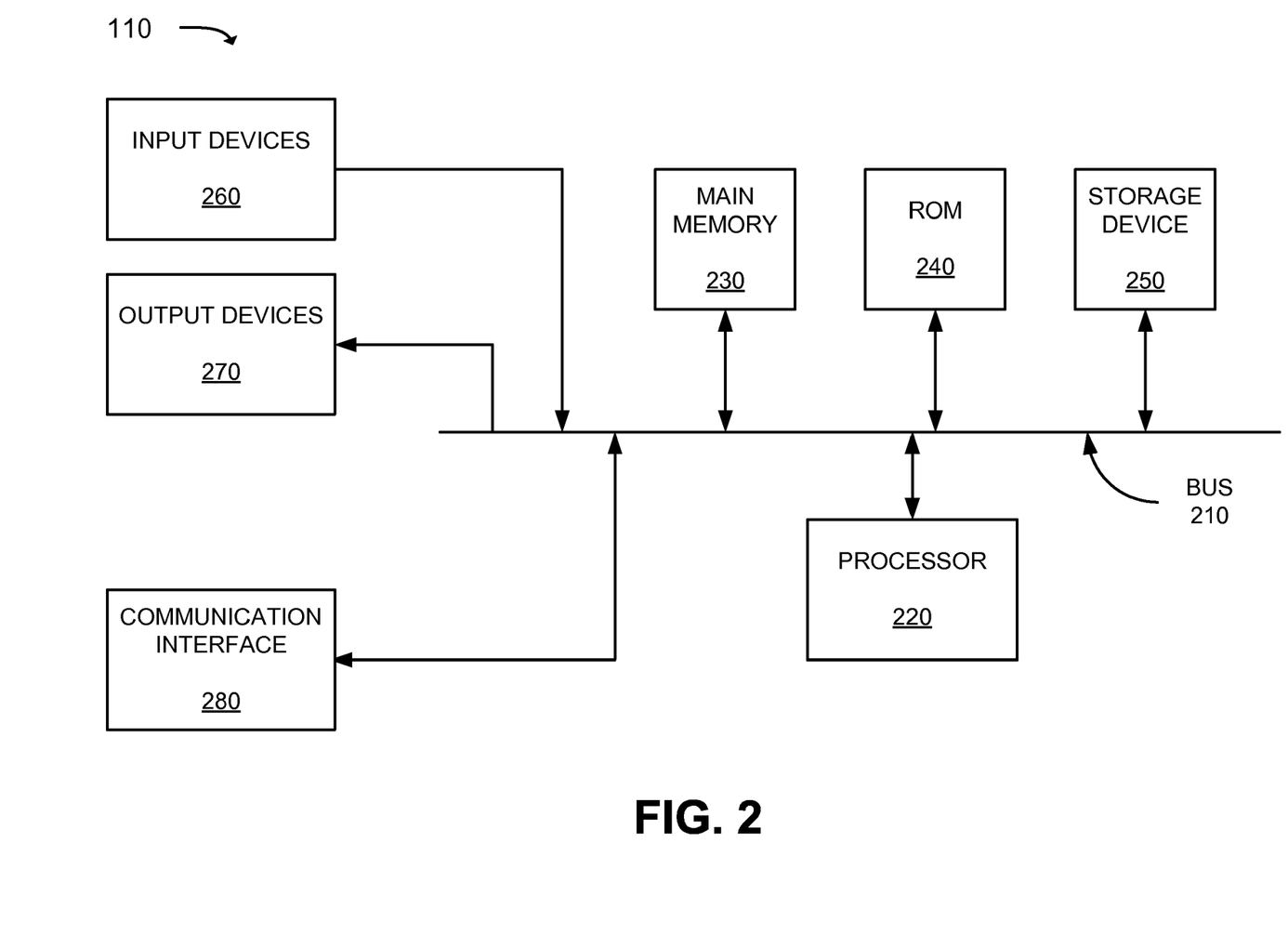
FIG. 2 is an exemplary diagram of a node of FIG. 1 according to an implementation consistent with the principles of the invention.

FIG. 2 is an exemplary diagram of a node 110 according to an implementation consistent with the principles of the invention. Node 110 may include a bus 210, a processor 220, a main memory 230, a read only memory (ROM) 240, a storage device 250, one or more input devices 260, one or more output devices 270, and a communication interface 280. Bus 210 may include one or more conductors that permit communication among the components of node 110.

Processor 220 may include any type of conventional processor or microprocessor that interprets and executes instructions. Main memory 230 may include a random access memory (RAM) or another type of dynamic storage device that stores information and instructions for execution by processor 220. ROM 240 may include a conventional ROM device or another type of static storage device that stores static information and instructions for use by processor 220. Storage device 250 may include a magnetic and/or optical recording medium and its corresponding drive.

Input device(s) 260 may include one or more conventional mechanisms that permit an operator to input information to node 110, such as a keyboard, a mouse, a pen, voice recognition and/or biometric mechanisms, etc. Output device(s) 270 may include one or more conventional mechanisms that output information to the operator, including a display, a printer, a speaker, etc. Communication interface 280 may include any transceiver-like mechanism that enables node 110 to communicate with other nodes 110 and/or repository 120.

As will be described in detail below, node 110, consistent with the principles of the invention, may perform certain operations relating to model generation. Node 110 may perform these operations in response to processor 220 executing software instructions contained in a computer-readable medium, such as memory 230. A computer-readable medium may be defined as one or more physical or logical memory devices and/or carrier waves.

The software instructions may be read into memory 230 from another computer-readable medium, such as data storage device 250, or from another device via communication interface 280. The software instructions contained in memory 230 causes processor 220 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Model Generation Processing

To facilitate generation of the model, a prior probability of the label for each instance may be determined: $P(Y|Z)$. This prior probability can be based on Z, which may include one or more values that differ based on the particular context in which the model is used. Typically, Z may be real valued and dense (i.e., it does not include many zero entries for many of the instances). In the e-mail context, each e-mail may be evaluated using a common spam detection program that gives each e-mail a score (e.g., Spam Assassin). The output of the spam detection program may be used as the prior probability that the e-mail is spam.

A set of instances based on the same or a different set of instances as in repository 120 or memory 115 may be used as "training data" D. For each instance d in the training data D, its features $(X_0, X_1, \ldots, X_m)$ may be extracted. For example, $X_0$ may be the feature corresponding to "the message contains the word 'free.'" In this implementation, the feature $X_0$ may include a boolean value, such that if "free" appears in the message, then $x_0$ is one, otherwise $x_0$ is zero. In other implementations, the features may include discrete values. It may be assumed that many of the features will have values of zero. Accordingly, a sparse representation for the features of each instance may be used. In this case, each instance may store only features that have non-zero values.

As will be explained later, it may be beneficial to quickly obtain statistics for the instances that contain particular features. To facilitate fast identification of correspondence between features and instances, a feature-to-instance index may be generated in some implementations to link features to the instances in which they are included. For example, for a given feature X, the set of instances that contain that feature may be listed. The list of instances for a feature X is called the "hitlist for feature X." Thereafter, given a set of features $X_0, \ldots, X_m$, the set of instances that contain those features can be determined by intersecting the hitlist for each of the features $X_0, \ldots, X_m$.

A "condition" C is a conjunction of features and possibly their complements. For example, a condition that includes two features is: "the message contains the word 'free'" and "the domain of the sender is "hotmail.com," and a condition that includes a feature and a complement of a feature is: "the message contains the word 'free'" and "the domain of the sender is not 'netscape.net.'" For any instance $d_i$, the value of its features may determine the set of conditions C that apply. A "rule" is a condition $C_i$ and a weight $w_i$, represented as ($C_i$, $w_i$). The model M may include a set of rules and a prior probability of the label.

Based, at least in part, on this information, a function may be created that maps conditions to a probability of the label: $P(Y|C_1, \ldots, C_n, Z)$. The posterior probability of the label given a set of conditions, $P(Y|C_1, \ldots, C_n, Z)$, may be determined using the function:

$$\text{Log } \{P(Y=y_0|C_1, \ldots, C_n, Z)/P(Y=y_1|C_1, \ldots, C_n, Z)\} = \text{Sum}_i\{-w_i I(C_i)\} + \text{Log } \{P(Y=y_0|Z)/P(Y=y_1|Z)\}, \quad \text{(Eqn. 1)}$$

where $I(C_i)=0$ if $C_i$=false, and $I(C_i)=1$ if $C_i$=true.

Thereafter, given a new instance d and a model M, the posterior probability of the label may be determined by: (1) extracting the features from the instance, (2) determining which rules apply, and (3) combining the weight of each rule with the prior probability for instance d. Therefore, the goal is to generate a good model. To generate a good model, the following information may be beneficial: the set of conditions $C_1, \ldots, C_n$, and the values of weights $w_1, \ldots, w_n$.

Figure 3:
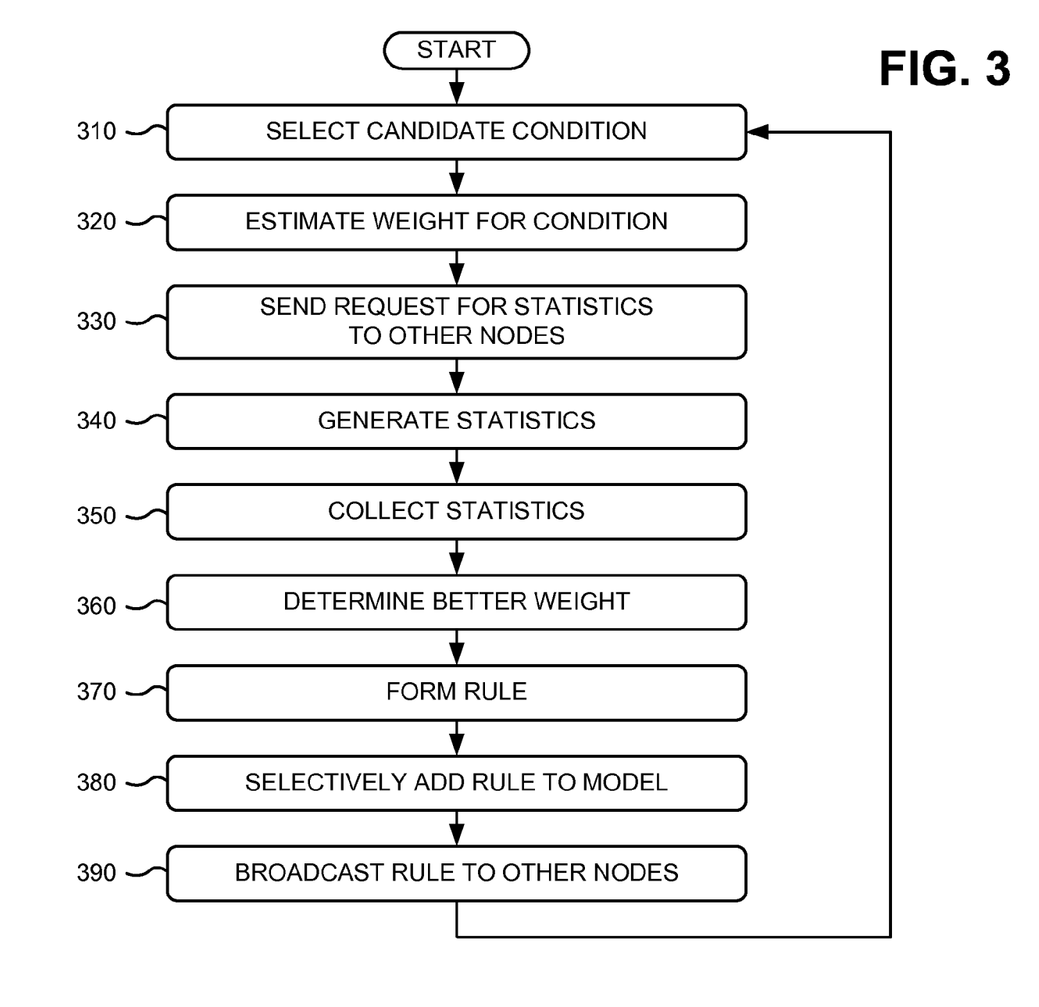
FIG. 3 is a flowchart of exemplary processing for generating a model according to a first implementation consistent with the principles of the invention.

FIG. 3 is a flowchart of exemplary processing for generating a model according to a first implementation consistent with the principles of the invention. This processing may be performed by a combination of nodes 110. Each node 110 may include a copy of the model M and a subset of instances with a current probability of $Y=y_1$ for each instance. Each node 110 may build its own feature-to-instance index for its subset of instances.

Processing may begin with an empty model M that includes the prior probability of the label. A node 110 may select a candidate condition C to be tested (act 310). It may be possible for multiple nodes 110, or all of nodes 110, to concurrently select candidate conditions. In one implementation, nodes 110 may select candidate conditions from the instances in training data D. For example, for each instance, combinations of features that are present in that instance (or complements of these features) may be chosen as candidate conditions. In another implementation, random sets of conditions may be selected as candidate conditions. In yet another implementation, single feature conditions may be considered as candidate conditions. In a further implementation, existing conditions in the model M may be augmented by adding extra features and these augmented conditions may be considered as candidate conditions. In yet other implementations, candidate conditions may be selected in other ways.

Node 110 may then estimate a weight w for condition C (act 320). Assume that condition C includes three features: $X_1$ and $X_5$ and $X_{10}$. In order to find the set of instances that satisfy condition C, node 110 may use its feature-to-instance index.

Given the set of instances that satisfy the condition C, node 110 may gather statistics regarding these instances. If the label of instance d is y[d] and instance d satisfies conditions $C_1, \ldots, C_k$, then node 110 may determine first and second derivatives of:

$$\text{Sum}_d\{\text{Log } P(Y=y[d]|C_1, \ldots, C_k, C)\} - \text{Sum}_d\{\text{Log } P(Y=y[d]|C_1, \ldots, C_k)\} = \text{Sum}_d\{\text{Log } P(Y=y[d]|C_1, \ldots, C_k, C) - \text{Log } P(Y=y[d]|C_1, \ldots, C_k)\}, \quad \text{(Eqn. 2)}$$

where $P(y[d]|C_1, \ldots, C_k, C)$ is given above (in Eqn. 1) and the weights given above (in Eqn. 1) are the weights in our current model M together with an initial guess for weight w for condition C (or the current weight w for condition C if condition C is already in the model). Node 110 may then use the derivatives to find an estimated weight w in a conventional manner using a technique, such as Newton's method. Alternatively, weight w for condition C may be estimated using a random guess, rather than Newton's method.

Node 110 may then generate a request for statistics that node 110 may send to the other nodes 110 (act 330). The request, in this case, may include the list of features that condition C contains, an identifier corresponding to node 110, and the estimate of the weight determined by node 110. Node 110 may broadcast this request to the other nodes 110.

Each of nodes 110 receiving the request (hereinafter "receiving nodes") may generate statistics for instances that satisfy condition C (act 340). For example, a receiving node may use its feature-to-instance index to identify the set of instances (within its subset of instances for which it is responsible) that correspond to the features of condition C. Using this set of instances and the current probability of $Y=y_1$ for each of these instances, the receiving node may generate statistics (e.g., derivatives), as described above with respect to Eqn. 2. The receiving nodes may then send the statistics to node 110 that sent the request.

Node 110 may collect statistics from the receiving nodes and use these statistics to determine a better weight w for condition C (acts 350 and 360). For example, node 110 may use Newton's method to determine a new weight w' from the derivatives generated by the receiving nodes. Node 110 may then use this weight w' to form a rule or update an existing rule: (C, w') (act 370).

Node 110 may selectively add the rule to the model M (e.g., add a new rule or update an existing rule in the model M) (act 380). To determine whether to add the rule, node 110 may compare the likelihood of the training data D between the current model with the rule (C, w') and the current model without the rule (i.e., P(D|M, (C, w')) vs. P(D|M)). If P(D|M, (C, w')) is sufficiently greater than P(D|M), then the rule (C, w') may be added to the model M. A penalty or "Cost" for each condition C may be used to aid in the determination of whether P(D|M, (C, w')) is sufficiently greater than P(D|M). For example, if condition C includes many features, or if the features of condition C are quite rare (e.g., "does the word 'mahogany' appear in the message"), then the cost of condition C could be high. The rule (C, w') may then be added to the model M if: Log {P(D|M, (C, w')} – Log {P(D|M)} > Cost(C). If P(D|M, (C, w')) is not sufficiently greater than P(D|M), then the rule (C, w') may be discarded (i.e., not added to the model M), possibly by changing its weight to zero.

Node 110 may send the rule to the other nodes 110 (e.g., the receiving nodes) (act 390). If node 110 determined that the rule should not be added to the model M, then node 110 may set the weight for the rule to zero and transmit it to the receiving nodes. Alternatively, node 110 may not send the rule at all when the rule is not added to the model or the rule's weight has not changed. The receiving nodes may use the rule to update their copy of the model, as necessary, and update the current probabilities of $Y=y_1$ for the instances that satisfy the condition contained in the rule (i.e., condition C). The receiving nodes may identify these instances using their feature-to-instance indexes.

Processing may then return to act 310, where node 110 selects the next candidate condition. Processing may continue for a predetermined number of iterations or until all candidate conditions have been considered. During this processing, each condition may eventually be selected only once or, alternatively, conditions may eventually be selected multiple times.

As described previously, the acts described with respect to FIG. 3 may occur on multiple nodes 110 concurrently. In other words, various nodes 110 may be sending out statistics requests and processing requests at the same time. It is not necessary, however, that each of nodes 110 perform all of the acts described with regard to FIG. 3. For example, a subset of nodes 110 may select candidate conditions and form rules for the model. The remaining nodes 110 may process the statistics requests, but form no rules.

Figure 4:
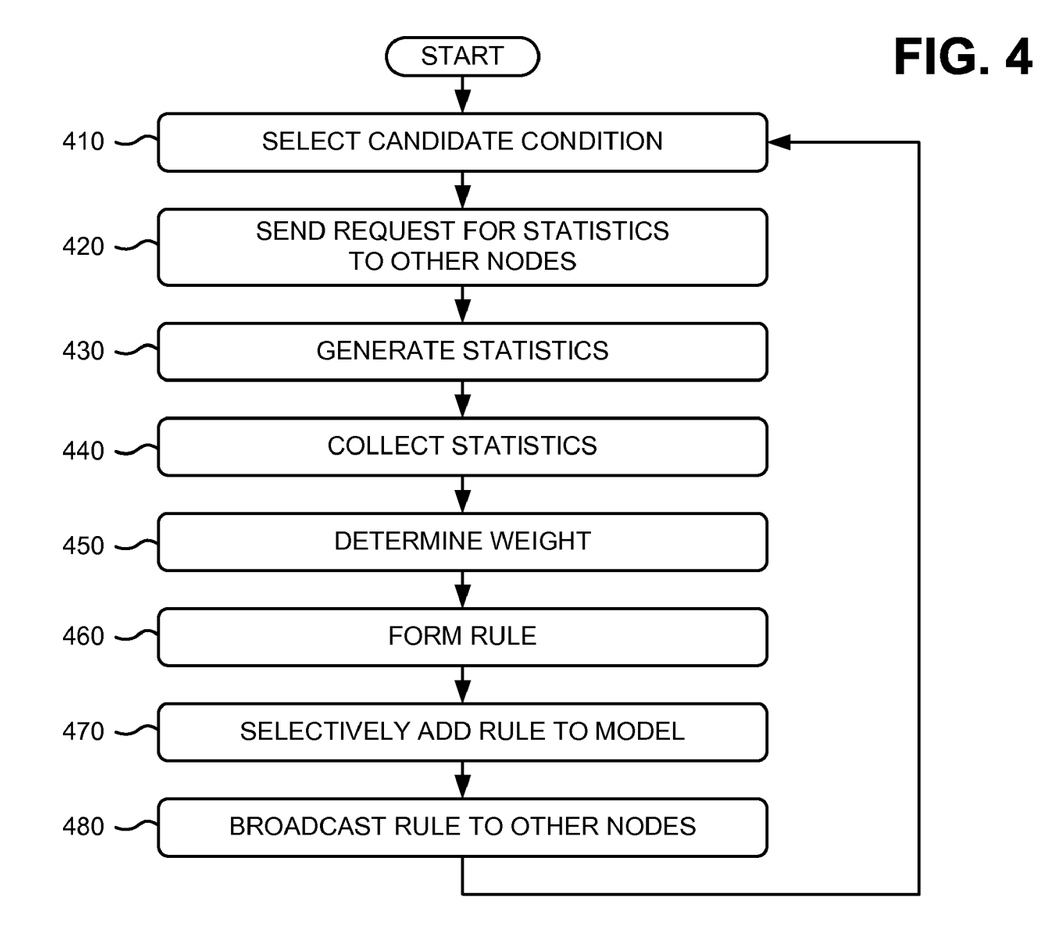
FIG. 4 is a flowchart of exemplary processing for generating a model according to a second implementation consistent with the principles of the invention.

FIG. 4 is a flowchart of exemplary processing for generating a model according to a second implementation consistent with the principles of the invention. This processing may also be performed by a combination of nodes 110. Each node 110 may include a copy of the model M and a subset of instances with a current probability of $Y=y_1$ for each instance. Each node 110 may build its own feature-to-instance index for its subset of instances.

Processing may begin with an empty model M that includes the prior probability of the label. A node 110 may select a candidate condition C to be tested (act 410). It may be possible for multiple nodes 110, or all of nodes 110, to concurrently select candidate conditions. Candidate conditions may be selected in a manner similar to that described above with regard to FIG. 3.

Node 110 may then generate a request for statistics that node 110 may send to the other nodes 110 (act 420). The request, in this case, may include the list of features that condition C contains and an identifier corresponding to node 110. Node 110 may broadcast this request to the other nodes 110.

Each of nodes 110 receiving the request (hereinafter "receiving nodes") may generate statistics for instances that satisfy condition C (act 430). For example, a receiving node may use its feature-to-instance index to identify the set of instances (within its subset of instances for which it is responsible) that correspond to the features of condition C. The receiving node may create a histogram of Log $P(Y=y_0|C_1, \ldots, C_k)$ for the different instances d that satisfy condition C and are labeled $y_0$, and create another histogram of Log $P(Y=y_1|C_1, \ldots, C_k)$ for the different instances d that satisfy condition C and are labeled $y_1$. The receiving nodes may then send the statistics to node 110 that sent the request.

Node 110 may collect statistics from the receiving nodes and use these statistics to determine a weight w for condition C (acts 440 and 450). For example, node 110 may determine an estimate of weight w from: $\text{Sum}_d\{\text{Log } P(Y=y[d]|C_1, \ldots, C_k, C)\}$. Node 110 may then continue to estimate the weight w (e.g., using a binary search, a hill climbing search, or a Newton iteration) until $\text{Sum}_d\{\text{Log } P(Y=y[d]|C_1, \ldots, C_k, C)\}$ is maximized. Node 110 may then use this weight w to form a rule or update an existing rule: (C, w) (act 460).

Node 110 may selectively add the rule to the model M (e.g., add a new rule or update an existing rule in the model M) (act 470). To determine whether to add the rule, node 110 may compare the likelihood of the training data D between the current model with the rule (C, w) and the current model without the rule (i.e., P(D|M, (C, w)) vs. P(D|M)). If P(D|M, (C, w)) is sufficiently greater than P(D|M), then the rule (C, w) may be added to the model M. As described above, a penalty or "Cost" may be associated with each condition C to aid in the determination of whether P(D|M, (C, w)) is sufficiently greater than P(D|M). If P(D|M, (C, w)) is not sufficiently greater than P(D|M), then the rule (C, w) may be discarded (i.e., not added to the model M), possibly by changing its weight to zero.

Node 110 may send the rule to the other nodes 110 (e.g., the receiving nodes) (act 480). If node 110 determined that the rule should not be added to the model M, then node 110 may set the weight for the rule to zero and transmit it to the receiving nodes. Alternatively, node 110 may not send the rule at all when the rule is not added to the model or the rule's weight has not changed. The receiving nodes may use the rule to update their copy of the model, as necessary, and update the current probabilities of $Y=y_1$ for the instances that satisfy the condition contained in the rule (i.e., condition C). The receiving nodes may identify these instances using their feature-to-instance indexes.

Processing may then return to act 410, where node 110 selects the next candidate condition. Processing may continue for a predetermined number of iterations or until all candidate conditions have been considered. During this processing, each condition may eventually be selected only once or, alternatively, conditions may be selected multiple times.

As described previously, the acts described with respect to FIG. 4 may occur on multiple nodes 110 concurrently. In other words, various nodes 110 may be sending out statistics requests and processing requests at the same time. It is not necessary, however, that each of nodes 110 perform all of the acts described with regard to FIG. 4. For example, a subset of nodes 110 may select candidate conditions and form rules for the model. The remaining nodes 110 may process the statistics requests, but form no rules.

Figure 5:
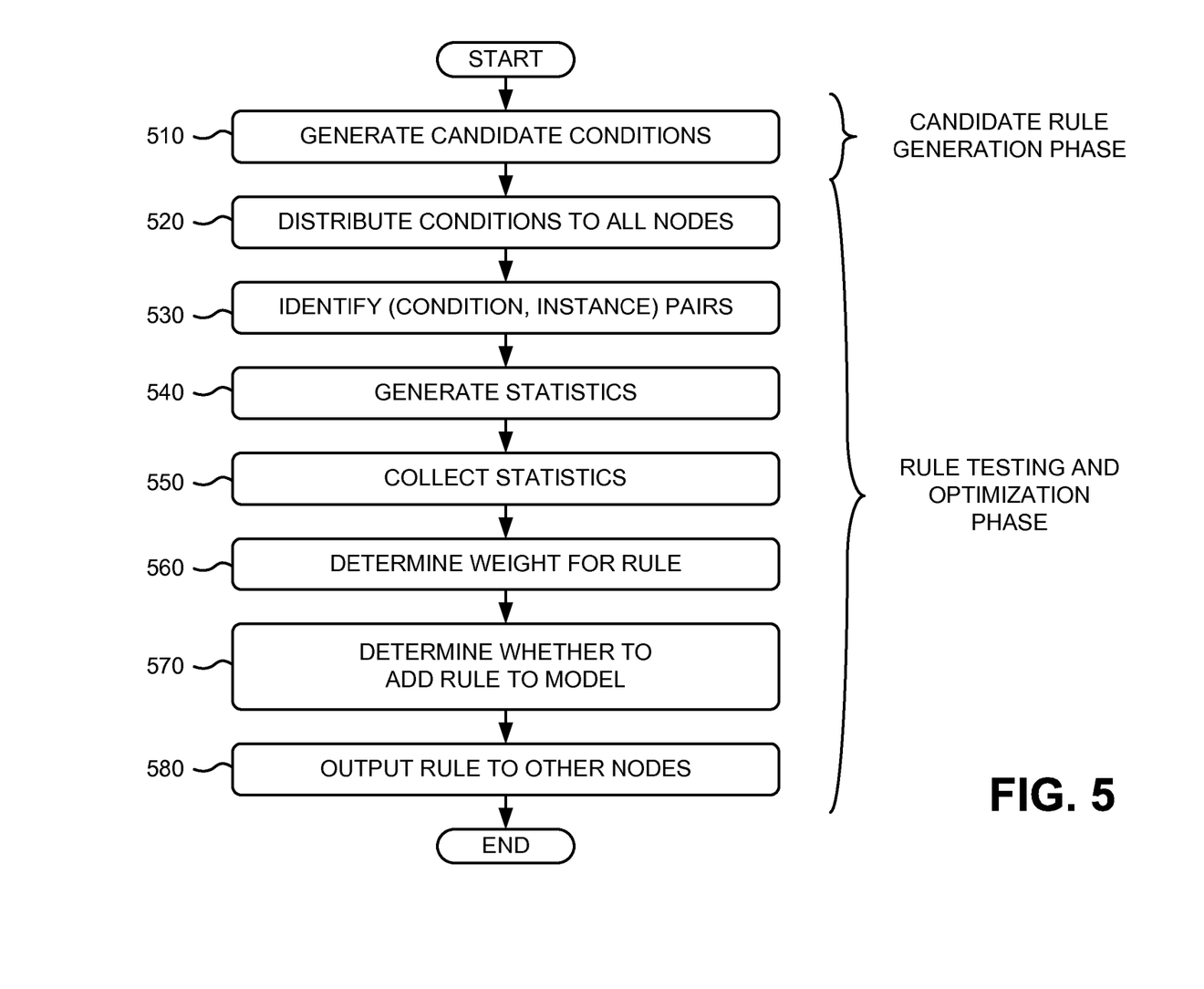
FIG. 5 is a flowchart of exemplary processing for generating a model according to a third implementation consistent with the principles of the invention.

FIG. 5 is a flowchart of exemplary processing for generating a model according to a third implementation consistent with the principles of the invention. This processing may also be performed by a combination of nodes 110. Each node 110 may include a copy of the model M (or a fraction of the model M) and a subset of instances with a current probability of $Y=y_1$ for each instance. In this implementation, nodes 110 do not use a feature-to-instance index.

Generally, the processing of FIG. 5 may be divided into iterations. Rules may be tested or have their weight optimized once per iteration. Each iteration may be broken into two phases: a candidate rule generation phase and a rule testing and optimization phase. The rule testing and optimization phase may determine the weights for conditions generated in the candidate rule generation phase, and accepts rules into the model if their benefit (e.g., difference in log likelihood) exceeds their cost.

Processing may begin with the generation of new conditions as candidate conditions to test whether they would make good rules for the model M (act 510). The generation of new conditions may concurrently occur on multiple nodes 110. There are several possible ways of generating candidate conditions. For example, candidate conditions might include all conditions with one feature, all conditions with two features that co-occur in some instance, and all extensions of existing rules by one feature (where the combination is in some instance). As a further optimization, extensions of only those rules added in the last iteration may be used.

The goal of the candidate rule generation phase is to generate new conditions that match some minimum number of instances. There are a couple of strategies for accomplishing this. For example, conditions that appear multiple times in some fraction of the instances (divided among all of nodes 110 and then summed) may be considered. In this case, each node 110 may count the number of instances (of the subset of instances for which node 110 is responsible) that match the condition and generate (condition, count) pairs. The (condition, count) pairs may be gathered at some node 110 (which may be determined by a rule, such as a hash of the condition) and summed. Conditions with some minimum count value may then be kept as candidate conditions. All other conditions may be dropped.

Alternatively, conditions that appear a certain number of times on a single node 110 may be considered. In other words, each node 110 may count the number of instances (of the subset of instances for which node 110 is responsible) that match the condition. Conditions with some minimum count value on a single node 110 may be kept as candidate conditions. The candidate conditions may be gathered at some node 110 to facilitate the removal of duplicate conditions.

Then in the rule testing and optimization phase, the candidate conditions may be distributed to all nodes 110 (act 520). Each node 110 may analyze its share of instances to identify which of the candidate conditions match each instance (act 530). Node 110 may store the matching conditions and instances as (condition, instance number) pairs (act 530). Each node 110 may then sort the (condition, instance number) pairs by condition to form a sorted condition-instance list. From the sorted condition-instance list, all instances that match a particular condition may easily be determined.

Each node 110 may generate statistics for each of the conditions in the sorted condition-instance list (act 540). For example, a node 110 may collect information regarding predicted label probability from the matching instances and the actual number of observed $y_0$ labels. In one exemplary implementation, nodes 110 may build a histogram based, at least in part, on the collected information and use the histogram as the statistics relating to the condition. In another exemplary implementation, the statistics may take a different form.

Each node 110 may then send the statistics relating to the condition to a particular node 110 designated to handle that condition. The particular node 110 may be determined, for example, based on a rule, such as a hash of the condition. Node 110 may collect the statistics relating to the condition from the other nodes 110 (act 550). Node 110 may then determine an optimal weight w for the rule (C, w) and determine whether to add the rule to the model M (acts 560 and 570). Node 110 may use techniques similar to those described above with regard to FIGS. 3 and 4 to determine the optimal weight w and determine whether to add the rule to the model M.

Node 110 may then send the rule to the other nodes 110, or just those nodes 110 that sent statistics (i.e., those nodes 110 with instances that match the condition of the rule) (act 580). If node 110 determined that the rule should not be added to the model M, then node 110 may set the weight for the rule to zero and transmit it to the other nodes 110. Alternatively, node 110 may not send the rule at all when the rule is not added to the model. Nodes 110 that receive the rule may use the rule to update their copy of the model, as necessary, and update the predicted label probabilities for the instances that satisfy the condition contained in the rule.

The rule testing and optimization phase may continue for a number of iterations or until all rules have been tested. The output of the rule testing and optimization phase is new weights for all existing rules (possibly zero if the rule is to be dropped from the model M) and a list of new rules.

As described previously, the acts described with respect to FIG. 5 may occur on multiple nodes 110 concurrently. In other words, various nodes 110 may be concurrently selecting candidate conditions and/or testing rules for the model M. It is not necessary, however, that each of nodes 110 perform all of the acts described with regard to FIG. 5. For example, a subset of nodes 110 may be responsible for selecting candidate conditions and/or testing rules for the model.

CONCLUSION

Systems and methods consistent with the principles of the invention may generate a model from a large data set (e.g., a data set that includes possibly millions of data items) efficiently on multiple nodes.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while series of acts have been described with regard to FIGS. 3-5, the order of the acts may be modified in other implementations consistent with the principles of the invention. Also, non-dependent acts may be performed in parallel. Further, the acts may be modified in other ways. For example, in another exemplary implementation, acts 330-360 of FIG. 3 or acts 420-450 of FIG. 4 may be performed in a loop for a number of iterations to settle on a good weight.

Also, in the three implementations described with regard to FIGS. 3-5, for each instance d, there is no need to compute the probability of y[d] given model M every time a condition that instance d satisfies is tested. Instead, there could be an array that keeps the current probability of instance d being $y_0$ given the model M, and when a condition C is updated, the probabilities for the instances that match that condition C may be updated. The probabilities for the instances that do not match the condition C may be left unchanged.

It will also be apparent to one of ordinary skill in the art that aspects of the invention, as described above, may be implemented in many different forms of software, firmware, and hardware in the implementations illustrated in the figures. The actual software code or specialized control hardware used to implement aspects consistent with the present invention is not limiting of the present invention. Thus, the operation and behavior of the aspects were described without reference to the specific software code—it being understood that one of ordinary skill in the art would be able to design software and control hardware to implement the aspects based on the description herein.

What is claimed is:

1. A computer-implemented method, comprising:
 generating, by one or more server devices, a model that is based on:
  a condition that includes a conjunction of a plurality of features associated with documents, and
  statistics, received from one or more other devices, associated with the condition, where a particular statistic from a particular device, of the one or more other devices, indicates a weight, determined by the particular device, for the condition,
 generating the model including:
  generating a new weight for the condition, for use in the model, based on the received statistics from the one or more other devices, the new weight for the condition indicating how relevant the condition is, with respect to other conditions in the model, in determining how relevant a document is to a search query, generating a candidate rule for the model based on the condition and the received statistics, determining whether to add the candidate rule to the model, and upon determining that the candidate rule should not be added to the model, setting a weight, for the rule, to a value that indicates that the candidate rule should not be added to the model; and using, by the one or more server devices, the model to generate a rank for a document, the rank indicating an estimated probability that the document is relevant to a received search query.

2. The computer-implemented method of claim 1, where the condition includes three or more features.

3. The computer-implemented method of claim 1, where a particular statistic received from a particular device of the one or more other devices indicates a set of instances that are associated with the particular device and that correspond to the features of the condition.

4. The computer-implemented method of claim 1, where generating the model includes:

replacing, in the model, a previous rule, that is based on the condition and a previous weight, with a new rule that is based on the condition and the new weight.

5. The computer-implemented method of claim 4, where the replacing includes:

selectively replacing the previous rule with the new rule, based on a cost associated with the condition.

6. The computer-implemented method of claim 1, where generating the model includes:

generating a new rule that is based on the condition and the new weight, and adding the new rule to the model.

7. The computer-implemented method of claim 6, where the adding is performed selectively, based on a cost associated with the condition.

8. The computer-implemented method of claim 1, further comprising:

generating a rule based on the condition and the received statistics, and sending the rule to the one or more other devices.

9. The computer-implemented method of claim 1, where the value is zero.

10. The computer-implemented method of claim 1, where generating the model includes:

generating a candidate rule for the model based on the condition and the received statistics, determining whether to add the candidate rule to the model, and upon determining that the candidate rule should not be added to the model, informing the one or more other devices that the candidate rule should not be added to the model.

11. A system comprising:

a memory to store computer-readable instructions; and one or more processors to execute the instructions to:

generate a model that is based on a condition that includes a conjunction of a plurality of features associated with documents, and statistics, received from one or more other devices, associated with the condition, where a particular statistic from a particular device, of the one or more other devices, indicates a weight, determined by the particular device, for the condition, the processor, when generating of the model being further to:

generate a new weight for the condition, for use in the model, based on the received statistics from the one or more other devices, the new weight for the condition indicating how relevant the condition is, with respect to other conditions in the model, in determining how relevant a document is to a search query, and generate a candidate rule for the model based on the condition and the received statistics, determine whether to add the candidate rule to the model, and upon determining that the candidate rule should not be added to the model, set a weight, for the rule, to a value that indicates that the candidate rule should not be added to the model; and use the model to generate a rank for a document, the rank indicating an estimated probability that the document is relevant to a received search query.

12. The system of claim 11, where a particular statistic received from a particular device of the one or more other devices indicates a set of instances that is associated with the particular device and that correspond to a plurality of features of the condition.

13. The system of claim 11, where, when generating the model, the one or more processors are to:

generate a new rule that is based on the condition and the new weight, and add the new rule to the model.

14. A memory device comprising:

one or more instructions which, when executed by a computer device, cause the computer device to generate a model that is based on a condition that includes a conjunction of a plurality of features associated with documents, and statistics, received from one or more other devices, associated with the condition, where a particular statistic from a particular device, of the one or more other devices, indicates a weight, determined by the particular device, for the condition, the one or more instructions to generate the model including:

one or more instructions to generate a new weight for the condition, for use in the model, based on the received statistics from the one or more other devices, the new weight for the condition indicating how relevant the condition is, with respect to other conditions in the model, in determining how relevant a document is to a search query, one or more instructions to generate a candidate rule for the model based on the condition and the received statistics, one or more instructions to determine whether to add the candidate rule to the model, and one or more instructions to set, upon determining that the candidate rule should not be added to the model, a weight, for the rule, to a value that indicates that the candidate rule should not be added to the model; and one or more instructions which, when executed by the computer device, cause the computer device to use the model to generate a rank for a document, the rank indicating an estimated probability that the document is relevant to a received search query.

15. The memory device of claim 14, where one or more instructions to generate the model includes:
- one or more instructions to replace, in the model, a previous rule, that is based on the condition and a previous weight, with a new rule that is based on the condition and the new weight, and
- where the one or more instructions to replace the previous rule include:
  - one or more instructions to selectively replace the previous rule with the new rule, based on a cost associated with the condition.

16. The memory device of claim 14, where the one or more instructions to generate the model includes:
- one or more instructions to generate a new rule that is based on the condition and the new weight; and
- one or more instructions to add the new rule to the mode, where the one or more instructions to add the new rule includes:
  - one or more instructions to add the new rule selectively, based on a cost associated with the condition.

17. The memory device of claim 14, further comprising:
- one or more instructions to generate a rule based on the condition and the received statistics; and
- one or more instructions to send the rule to the one or more other devices.

18. The memory device of claim 14, where the one or more instructions to generate the model include:
- one or more instructions to generate a candidate rule for the model based on the condition and the received statistics;
- one or more instructions to determine whether to add the candidate rule to the model; and
- one or more instructions to inform, upon determining that the candidate rule should not be added to the model, the one or more other devices that the candidate rule should not be added to the model.

* * * * *